350-96.24 SR
3/10/81 XR 4,255,754

United States Patent [19] [11] 4,255,754
Crean et al. [45] Mar. 10, 1981

[54] DIFFERENTIAL FIBER OPTIC SENSING METHOD AND APPARATUS FOR INK JET RECORDERS

[75] Inventors: Peter A. Crean, Penfield; Paul R. Spencer, Webster, both of N.Y.

[73] Assignee: Xerox Corporation, Stamford, Conn.

[21] Appl. No.: 21,420

[22] Filed: Mar. 19, 1979

[51] Int. Cl.[3] .......... G01D 18/00
[52] U.S. Cl. .......... 346/75; 250/227; 350/96.24
[58] Field of Search .......... 346/75; 350/96.24, 96.25, 350/96.27, 96.20, 96.21; 250/227, 578; 358/28

[56] References Cited

U.S. PATENT DOCUMENTS

| | | | |
|---|---|---|---|
| 3,224,279 | 12/1965 | Galli | 250/227 X |
| 3,718,822 | 2/1973 | Pascoe | 250/222 X |
| 3,907,429 | 9/1975 | Kuhn | 346/75 X |
| 3,969,733 | 7/1976 | DeMoss | 346/75 X |
| 4,062,620 | 12/1977 | Pirolli | 350/96.20 |
| 4,067,019 | 1/1978 | Fleischer | 346/75 |
| 4,117,460 | 9/1978 | Walworth | 250/227 X |
| 4,136,345 | 1/1979 | Neville | 346/75 |

OTHER PUBLICATIONS

Fan G. J.; Phase Detection on Ink Jet Drops; IBM Tech. Disc. Bulletin, vol. 16, No. 3, Aug. 1973, p. 880.
Chen et al; Feedback for Synchronized Pressure Jet Using Optical Sensor; IBM Tech. Disc. Bulletin, vol. 16, No. 12, May 1974, pp. 3877–3878.
Kuhn et al; Ink Drop Velocity Measurement Via Coded Plates and Photodetectors, IBM Tech. Disc. Bulletin, vol. 17, No. 5, Oct. 1975, p. 3069–3069A.
Fleischer et al; Optical Ink-Drop Sensor; IBM Tech. Disc. Bulletin, vol. 19, No. 5, Oct. 1976. p. 1870–1871.

*Primary Examiner*—Joseph W. Hartary
*Attorney, Agent, or Firm*—Michael H. Shanahan

[57] ABSTRACT

Optical fibers are used to sense fluid ink drops along the x, y and z axis of an orthogonal coordinate system. A drop sensing zone is defined in the narrow space between the faces of a single input fiber and two output fibers. An LED infrared light source is coupled to a remote end of the input fiber. Infrared sensitive photodiodes are coupled to the remote ends of each output fiber. The photodiodes are in turn coupled to a differential amplifier whose output represents a displacement error for the x and y axis and represents a time reference for the z axis for the case where the drop flight path is along the z axis. A plurality of sensors are disclosed in an ink recording system having a plurality of nozzles and in an ink recording system having an ink generator traversing the length of a high speed rotating drum.

27 Claims, 9 Drawing Figures

DIFFERENTIAL FIBER OPTIC SENSING METHOD AND APPARATUS FOR INK JET RECORDERS

BACKGROUND

This invention relates to ink jet recording systems, method and apparatus. In particular, this invention relates to sensing the location of the fluid drops while they are in flight.

Fluid drop recording systems including mechanical, electrical, electrostatic and magnetic deflection techniques invariable create a record by depositing drops in a given pattern on a record medium, i.e. at the various pixel positions within a raster pattern. A drop is placed at a desired pixel location by either moving a carriage holding the drop generator relative to the record, by magnetically or electrically deflecting the drop to the pixels or a combination of the foregoing techniques.

A sensor for detecting the position of the drop either in flight or upon impact is valuable for controlling droplet velocity, phasing and alignment to the raster pattern. U.S. Patents to Naylor et al No. 3,886,564; Carmichael et al, No. 3,992,713; and Hill et al, No. 3,769,630 and the patents cited therein are exemplary of various sensors and their application. The disclosures of those patents are incorporated herein. In electrostatic recorders the drops are sensed electrically either by impacting an electrode or by charge induction. Magnetic recorders, of course, may use magnetic flux coupling to detect a drop. Optical detection of drops is known. The U.S. Patent to Kuhn et al, No. 3,907,429 is an example of the use of light to detect the velocity of the drop. An article by G. J. Fan in *IBM Technical Disclosure Bulletin*, Vol. 16, No. 3 of August, 1973 discloses an optical fiber positioned to collect the light from a LED when not interrupted by the flight of drops.

The various prior art sensors do not have good signal to noise ratios and are subject to crosstalk, i.e. are frequently unable to differentiate from other drops in its own or an adjacent stream. Also, the prior art sensors are difficult to implement in recorders due to the small space available in devices where the drop size ranges from about 10 to 1,000 microns. They are also subject to contamination by the drop itself, i.e. the ink.

Accordingly, it is a principle object of this invention to overcome the limitations of prior art fluid drop sensors.

Another object of this invention is to measure or detect the position of small objects in the 10 to 1,000 micron diameter size range whether fluids, solids, spheres or cylinders.

Yet another object of the invention is to use a plurality of sensors in an electrostatic fluid drop recorder wherein each nozzle in an array of nozzles records along a segment of a row of pixels in a raster pattern by electrostatic deflection of the drops. The sensors are used to electrically calibrate each nozzle to accurately align the segments composed by each nozzle to the ideal pixel locations in a raster. This alignment process is also referred to as stitching.

Even a further object of the invention is to provide the sensor for detecting or measuring a fluid drop position independent of its electrostatic charge or magnetic properties.

Still another object is to detect the location of a drop in a system wherein the drop generator and target are moved relative to each other. In other words, it is an object to devise a "bulls eye" for a moving drop generator, moving target or both to test its accuracy at drop placement.

It is also an object of the present invention to devise means for sensing the presence of a drop along one, two or three axis of an orthogonal x, y, z coordinate system.

SUMMARY

The foregoing and other objects of the invention are achieved by a novel optical fiber sensor apparatus and method. The sensor employs one imput optical fiber and at least two output optical fibers. Free ends of the fibers are spaced a small distance from each other to accommodate the object to be sensed. In the case of the fluid drops in an ink jet recorder, the free end of the input fiber is on one side of the flight path of the drop and the free ends of the output fibers are on an opposite side. The remote end of the input fiber is coupled to light source. Preferably for ink jet recorders, the light source is an infrared light emitting diode (LED). The remote ends of each output fiber are coupled to separate photodetectors. Preferably for ink jet recorders, the photodetector is a photodiode responsive to infrared radiation. The ink, i.e. the fluid, is a dye dissolved in water and is transparent to the infrared. Consequently, contamination problems usually associated with the ink are significantly reduced.

In one embodiment, four output fibers are used with one input fiber. Two of the output fibers are located along the z axis parallel to the flight path of the drops to indicate the passage of a drop past the bisector between the two output fibers. The other two output fibers are located along the x axis of an orthogonal x, y and z system to give a measurement of the offset of a drop from the bisector of the distance between the two fibers.

In another embodiment, two input fibers and four output fibers are used. In this case, one group of one input and two output fibers is used to make a measurement along the x axis and the other group of fibers is used to make a measurement along the y axis. (Throughout the specification, drawings and claims, the orthogonal axis referred to is that corresponding to the right hand vector rule. The thumb is the z axis, the index finger the x axis and the middle finger the y axis. Z is always chosen as the axis substantially parallel to the flight path of the drop.)

The photodetectors coupled to the remote ends of the output fibers in the instant invention are in turn coupled to differential amplifiers. The output of the amplifier is a measurement of the location of a drop relative to the bisector of the distance between the output fibers, assuming perfect alignment in the x, y, z orthogonal axis system. The output from the x and y amplifiers are used in servo loops to position subsequently generated drops to the above-mentioned bisector. The zero crossing output from the z amplifier is used as a time reference to measure the velocity of the drop. In turn, the drop velocity information is used in a servo loop to achieve a desired drop velocity.

PRIOR ART STATEMENT

The Kuhn et al U.S. Pat. No. 3,907,429 mentioned above discloses an LED 15 and a single photodetector 19 on opposite sides of the flight path of a stream of drops 14. A grid or light baffle 16 is positioned adjacent to the photodetector. The grid has two holes or apertures 17 and 18 that allow the light of the LED to pass through the grid to the photodetector. The holes are aligned or spaced along the flight path of the drops, i.e. along the z axis.

The LED is strobed at a known frequency relative to the drop generation frequency. When the drop velocity is at a desired value, the time between the blanking of the two apertures 17 and 18 by the drops is a known value. Should the velocity of the drops change, the time between a drop blanking aperture 17 and 18 also changes. (See Column 3, lines 54–60 of the patent). The detected change in velocity is used to vary the fluid pressure in the manifold from which the drops are being generated.

In contrast, the sensor of this invention has two photodetectors, one each for two output fibers, that are used to generate an electrical zero crossing signal. The zero crossing signal is used to indicate alignment or misalignment of a drop relative to the bisector of the distance between two output fibers. The present optical sensor is significantly more discriminating than the LED, photodetector scheme in Kuhn et al. The light from a remotely located LED is brought to the sensing zone by an input fiber and emitted into a limited space from the free end of the input fiber. Similarly, detected light is collected at free ends of two fibers closely spaced to the free end of the input fiber. The photodiodes, like the LED, are located remotely from the sensing zone defined by the free ends of the fibers. The signal to noise ratio in this sensor is very high. Also, cross talk from adjacent sensors in a multiple sensor application is negligible due to the confined sensing zone geometry and the orientation of the fibers. The packaging capabilities of this invention is clearly superior to the Kuhn et al device. Also, see the U.S. Patent to Neville et al No. 4,136,345 disclosing a three aperture device similar to that of Kuhn et al capable of measuring drop offset from a reference line.

The disclosure by Fan in the *IBM Technical Disclosure Bulletin*, supra, is a simple electric eye. A single LED is spaced close to the free end of the single optical fiber. When the light from the LED is interrupted by a drop, a photodetector at the other end of the fiber turns on a voltage source coupled to a pair of deflection plates. This is analogous to an elevator door shutting automatically after a passenger enters or exits the elevator tripping the light sensing circuit. In contrast, the present invention uses one input and at least two output fibers to precisely locate a drop in flight relative to a reference line.

THE DRAWINGS

Other features and objects of the invention will be apparent from a full reading of the application in conjunction with the drawings. The drawings are:

Figure 3:
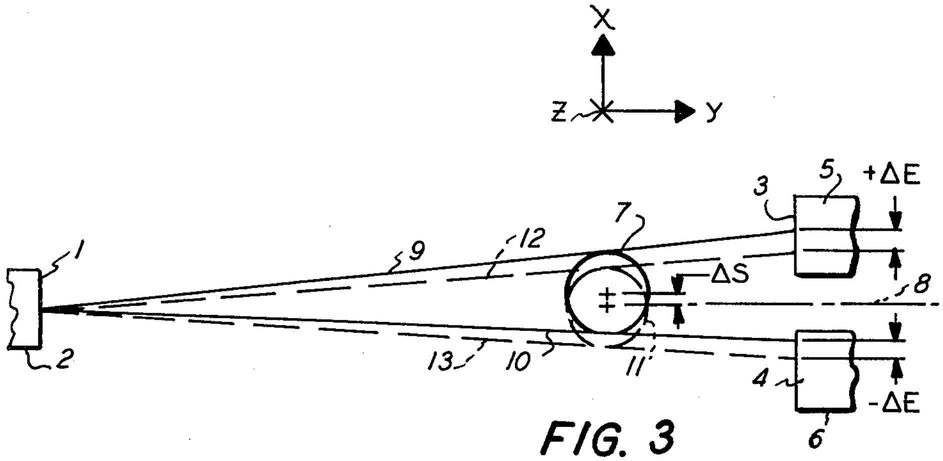

FIG. 3 is an enlarged sectional view of the ends of the optical fibers forming the present sensor. The sensing zone is the region between the free ends of input and output optical fibers. The fluid drop is shown located in the sensing zone.

Figure 1:
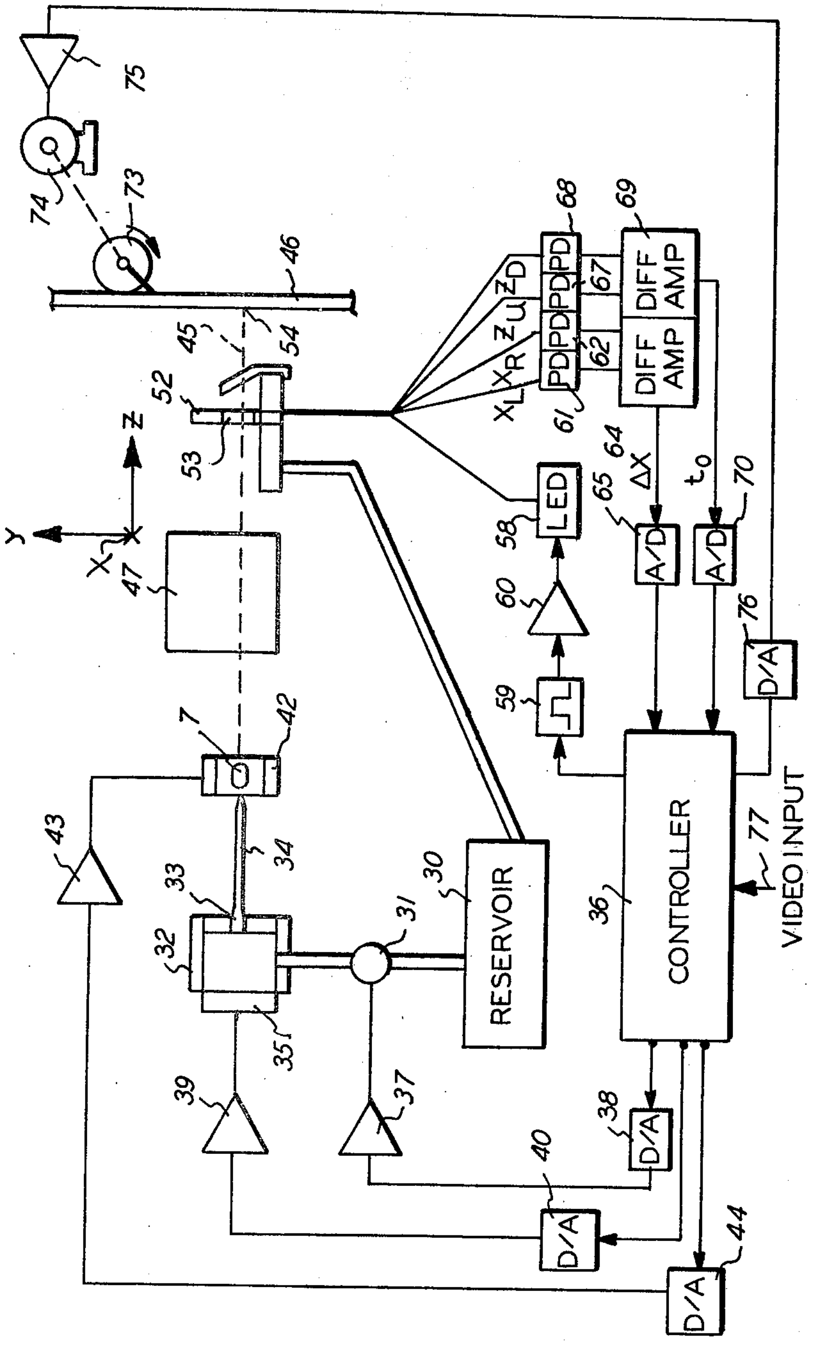
FIG. 1 is an elevation view in schematic form of a multiple nozzle, fluid drop recorder using multiple drop position sensors according to the present invention.
Figure 2:
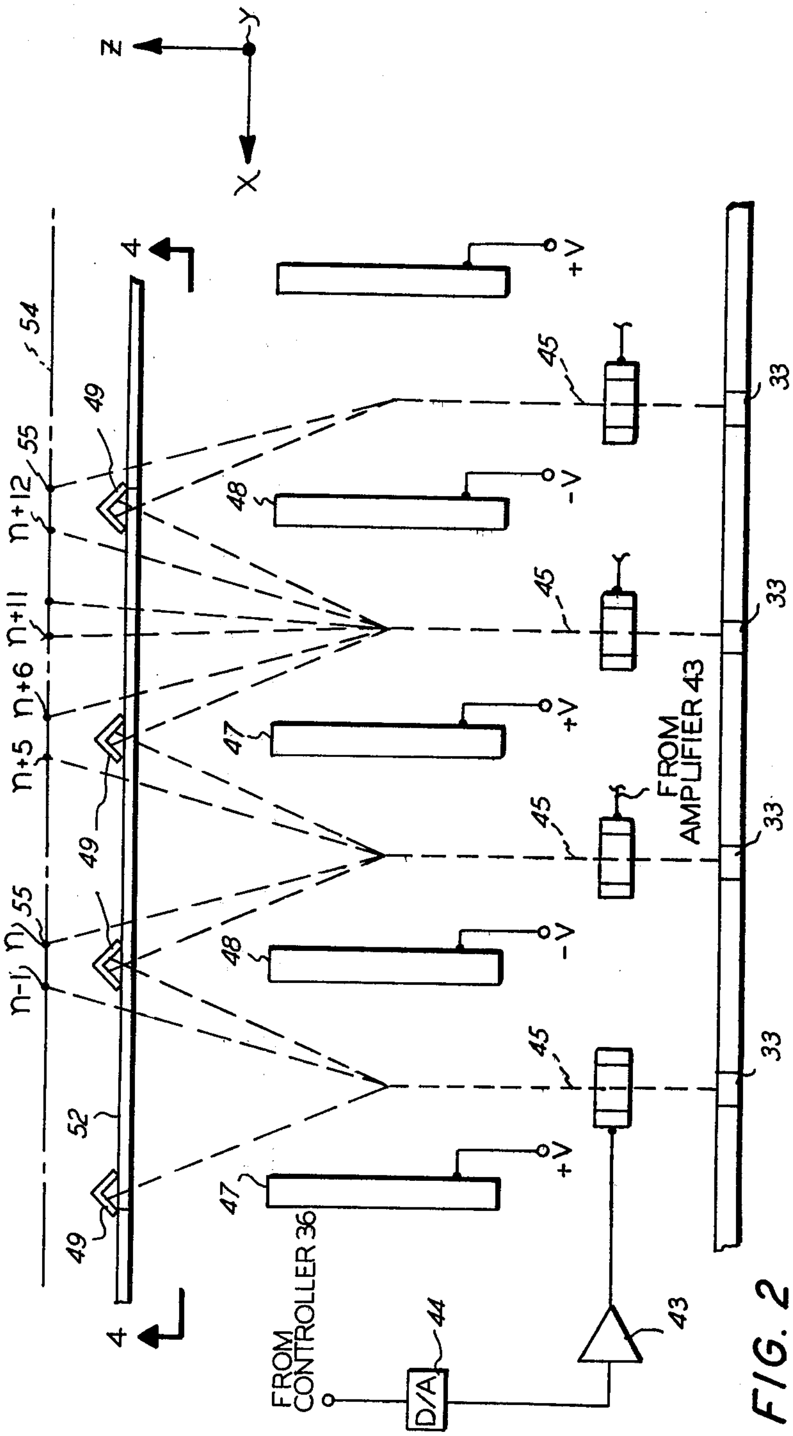
FIG. 2 is a plan view of major portions of the recorder of FIG. 1 to illustrate the multiple nozzle and sensor layout.
Figure 4:
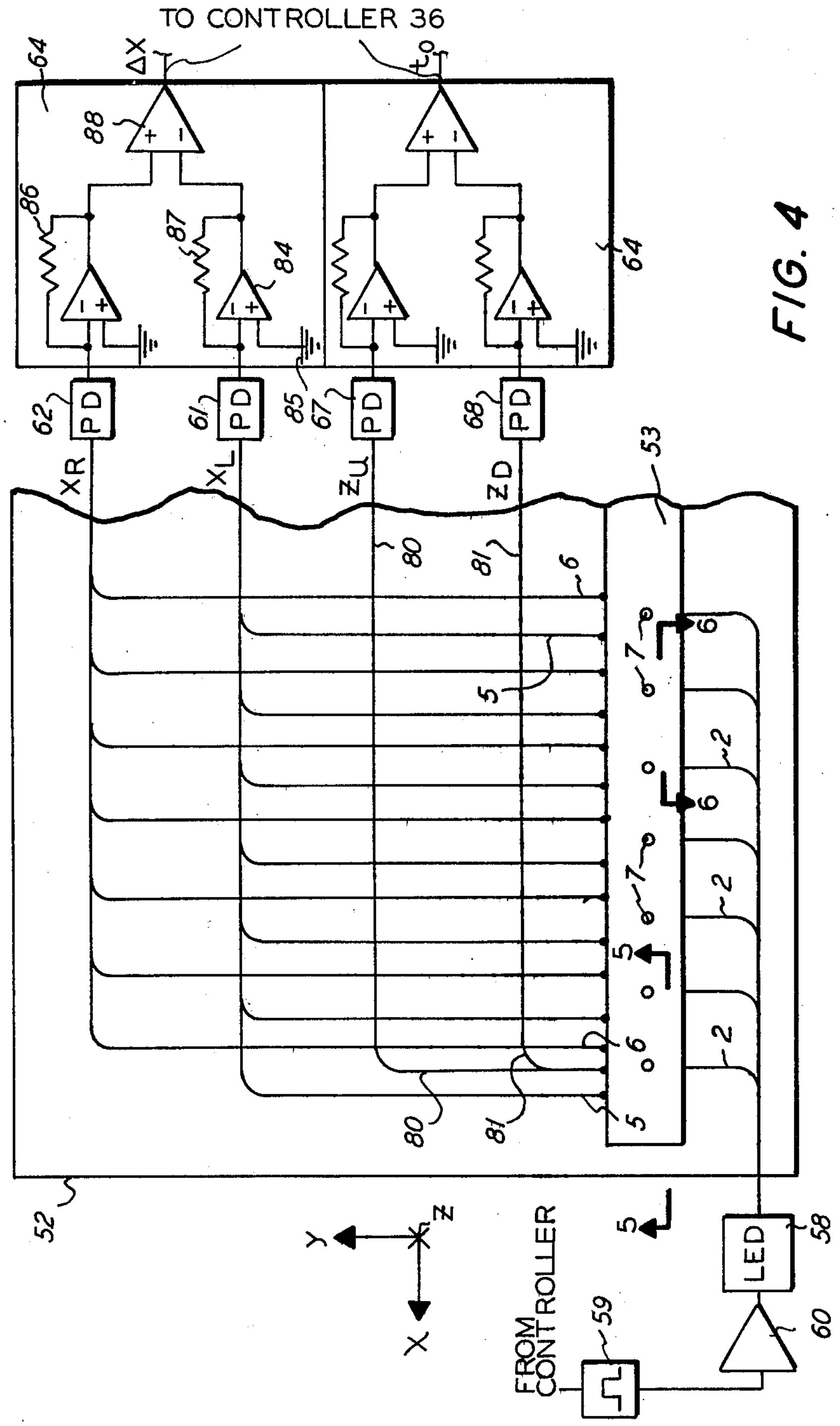

FIG. 4 is an enlarged view of the multiple sensor apparatus of FIGS. 1 and 2 as viewed along lines 4—4 in FIG. 2.

Figure 5:
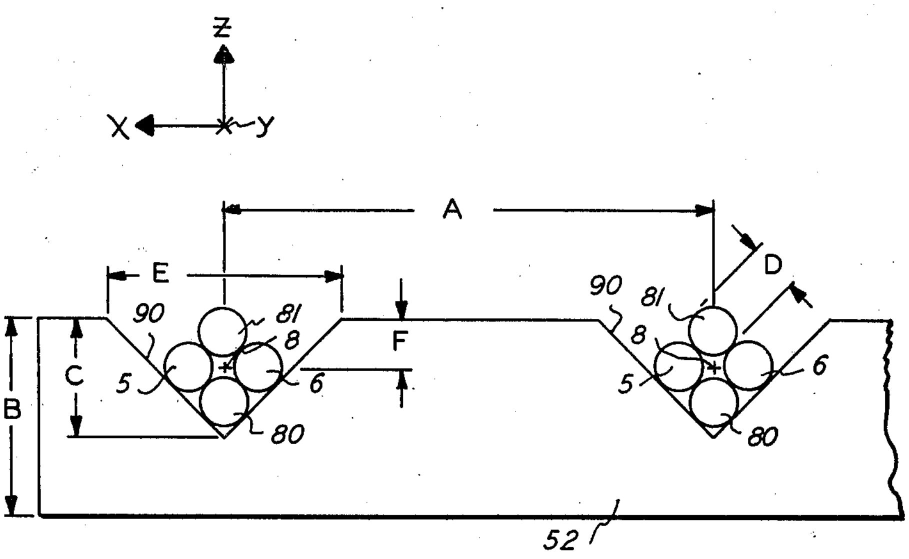

FIG. 5 is an enlarged isolated view of the free ends of the output optical fibers and their support member shown in FIG. 4 taken along lines 5—5.

Figure 6:
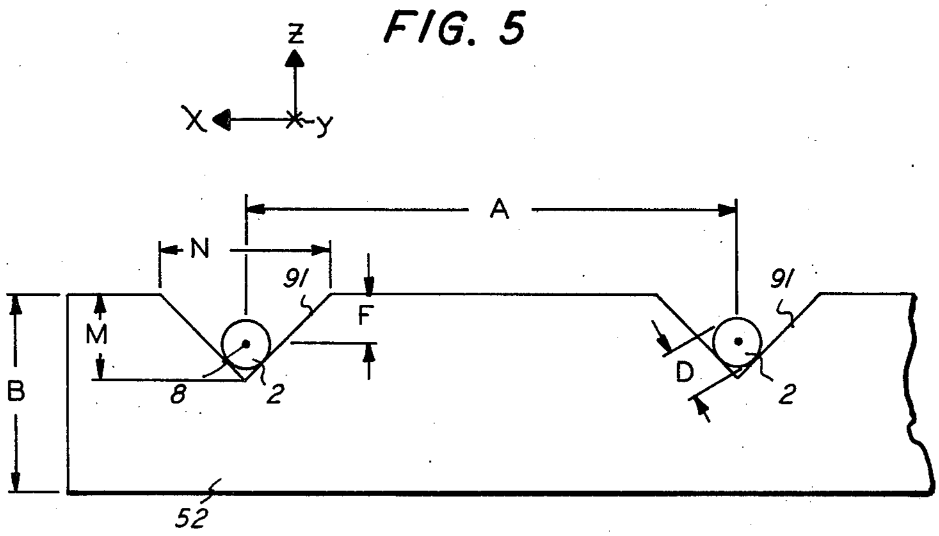

FIG. 6 is an enlarged isolated view of the free ends of input optical fibers and their support member shown in FIG. 4 taken along lines 6—6.

Figure 7:
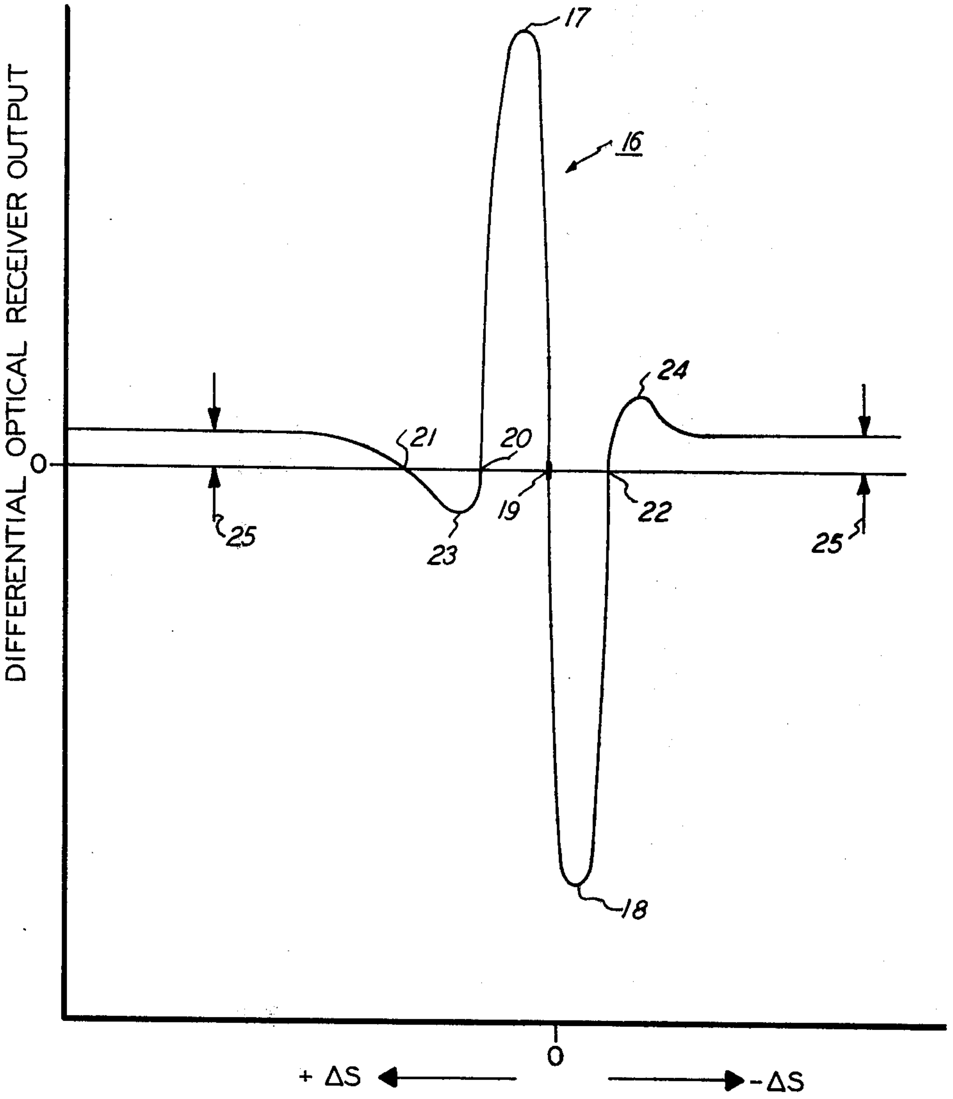

FIG. 7 is a graph representative of the output of a differential amplifier coupled to photodiodes at the remote ends of the output optical fibers. The zero crossing of the curve indicates the location of an object at the bisector of the space between the output fibers. The amplitude of the curve to the left and right of the zero crossing is proportional to the displacement of the object being sensed from the bisector over a limited range.

Figure 8:
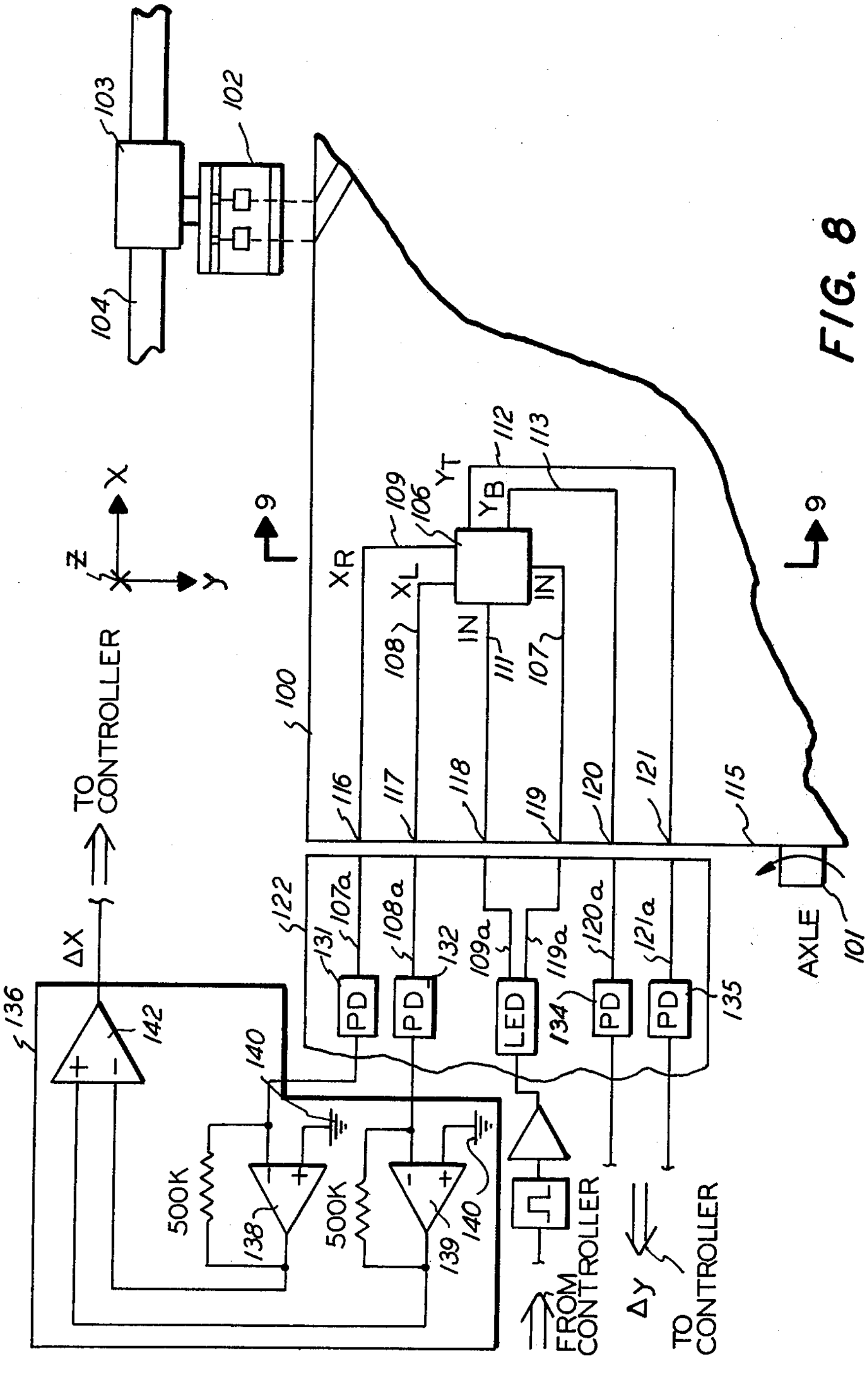

FIG. 8 is a partial, front elevational view of a recorder of the type employing a drum for supporting and transporting a record member and a carriage for supporting and transporting a fluid drop generator. The recorder uses a sensor according to the present invention for detecting drop positions along both x and y axes.

Figure 9:
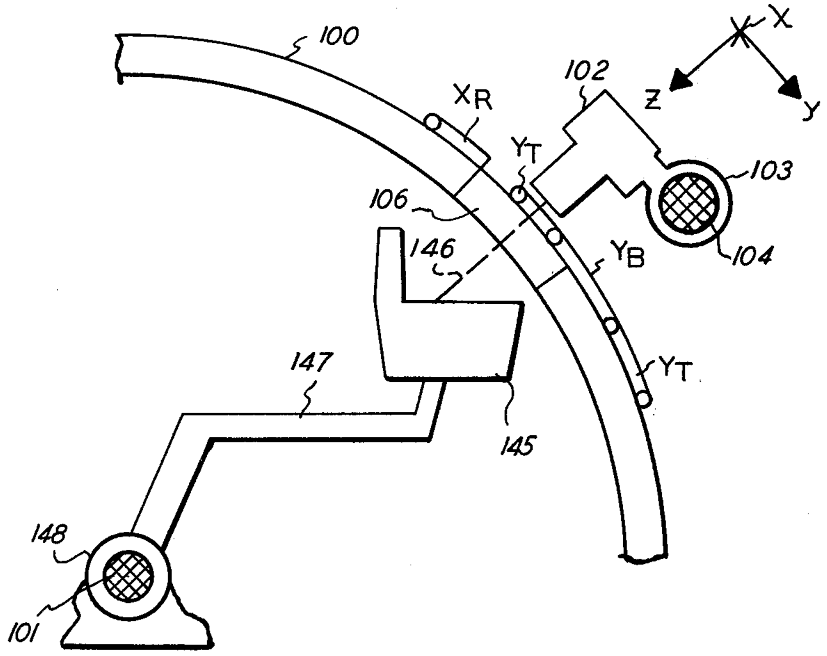

FIG. 9 is a sectional, elevation view of the recorder and sensor of FIG. 8 taken along lines 9—9.

DETAILED DESCRIPTION OF THE INVENTION

FIG. 3 should be referred to for an explanation of the sensor of the present invention. The sensing zone is the space between the free end 1 of the cylindrical input fiber 2 and the free ends 3 and 4 of the cylindrical output fibers 5 and 6. A spherical fluid drop 7 is located in the sensing zone. The center of drop 7 is located a small distance ΔS above the bisector 8 of the distance between the center lines of the cylindrical output fibers 5 and 6.

The lines 9 and 10 represent light rays emitted from the free end 1 of input fiber 2 and are tangent to the surface of the sphere 7. Extreme rays 9 and 10 define a shadow cast onto the free ends of the output fibers 3 and 4. The shadow cast onto the output fibers is asymmetrically distributed over the free ends 3 and 4 of the output fibers. For comparison, the dashed lines 11 represent a fluid drop that is precisely aligned to the bisector 8. The dashed lines 12 and 13 represent light rays that are tangent to the dashed sphere 11 and define the symmetrical (or reference) shadow cast onto the output fibers by an aligned drop 11.

The light source at the free end 1 of the input fiber is shown as a point source to help define the operation of the sensor. However, it should be understood that the actual shadow cast onto the output fibers is more complex since the light will come from all regions on the face of the input fiber 1. The term light should also be understood to include more than the visible region of the electromagnetic radiation spectrum and in particular the infrared region.

The x-axis sensor of FIG. 3 includes the single input fiber 2 and the two output fibers 5 and 6. When a drop is displaced from the bisector 8 (or some other reference line) the shadow cast onto the output fibers by the misaligned drop gives rise to an unbalanced (or at least a different) amount of light collected by the output fibers as indicated by rays 9 and 10 compared to rays 12 and 13. The remote ends of the output fibers 5 and 6 are coupled to photodiodes (not shown in FIG. 3). The photodiodes are in turn coupled to a differential amplifier. The amplitude of the output signal of the amplifier is directly proportional to the difference in the amount of light collected by fibers 5 and 6. That difference in collected light is directly proportional to the magnitude of the displacement of the drop along the x axis from the bisector 8 (or other reference line) over a limited range. The algebraic sign of the differential amplifier output indicates whether the drop is above or below the bisector reference line 8.

The x, y and z arrows in FIG. 3 give the orientation. The plus symbol at the intersection of the x and y vectors indicates the direction of the z vector into the page of the drawing. A dot at the intersection of the x and y vectors will indicate that the z vector is coming out of the plane of the page. This convention is used throughout the drawings.

The drop is in flight in the positive z axis into the plane of the page. The drop 7 is displaced a positive ΔS in the x axis above the bisector 8. The ΔS displacement is useful in a position servo even when the location of a drop varies along the y axis. The wide tolerance along the y axis is possible in a position servo because the aligned condition of drop 7 to the bisector (like the dashed line dot 11) results in a balanced amount of light collected by output fibers 5 and 6 regardless of the position of a drop along the y axis within the sensing zone. A different shadow is cast onto the output fibers at different positions in the y axis for a given ΔS. The amplitude of the differential amplifier varies for large displacements along y but is substantially constant over a range of about 2–5 drop diameters. In most systems as described herein, the drop misalignment along x or y would not exceed that level.

The displacement of the drop 7 along the y and z axis is measurable using a combination of one input and two output fibers like the fibers 2, 5 and 6. For a y axis sensor, the input fiber and the two output fibers of FIG. 3 are rotated 90° about the z axis. For a z axis sensor, the two output fibers are rotated 90° about the y axis. The input fiber is correctly aligned in the position shown in FIG. 3 for both an x axis and z axis sensor. This feature is exploited in the sensor of FIGS. 1 and 2 and as explained in connection with FIG. 5.

The curve 16 in FIG. 7 is a plot of the difference in light collected by optical fiber 5 relative to optical fiber 6 for various values of ΔS, where ΔS is the distance of a drop above or below the bisector 8 in FIG. 3. Curve 16 also corresponds to the output of a differential amplifier coupled by photodiodes to the fibers 5 and 6.

The difference in light collected by the two fibers is zero when no drop is in the sensing zone (ideally) and when a drop passes through the sensing zone is aligned to the bisector 8 (see drop 11 in FIG. 3). The positive primary peak 17 occurs when a drop is above bisector 8 a distance to cast the maximum shadow on fiber 5 and a minimum shadow on fiber 6. The negative primary peak 18 occurs when a drop is below bisector 8 a distance to cast the maximum shadow on fiber 6 and a minimum shadow on fiber 5. Simplistically, the maximum and minimum shadow conditions exists when the shadow of a drop covers one fiber and misses the other. However, the light patterns are more complex since light is also reflected and refracted by the drops.

The zero crossing 19 represents the condition at which the shadow of a drop is balanced at both output fibers 5 and 6 indicating drop alignment to the bisector 8, e.g. like drop 11. The region of curve 16 between the peak 17 and the left zero crossing 20 represents the decreasing shadow cast onto fiber 5 for larger and larger positive offsets ΔS. Finally, the negative position of curve 16 below the zero level between the left 20 and the far left 21 zero crossings is a region where light is reflected and refracted from a drop at a large ΔS above bisector 8 onto fiber 5 increasing its collected light relative to the condition when no drop is present. The region to the left of the zero crossing 21 is due to refraction and reflection of light from a drop to the lower fiber 6 from a drop at a comparatively large ΔS above the bisector 8.

A similar analysis for negative ΔS values is valid for the regions between the negative peak 18 and the right zero crossing 22. There is no far right zero crossing corresponding to the far left zero crossing 21. Ideally the curve is symmetrical with the amplitude of curve 16 going to zero for large plus and minus values of ΔS, i.e. the no drop condition. The offset 25 to the curve 16 indicates an imbalance in light collected by fibers 5 and 6 for the quiescent or no drop condition. Fiber 6 is collecting a small amount of light more than fiber 5.

The x axis and y axis sensors and positive servos discussed further on operate to drive the displacement of a drop to the bisector 8 which is indicated by the zero crossing 19. The region of curve 16 between the primary peaks 17 and 18 is nearly linear. A plus ΔS detected by a sensor is rapidly driven toward zero crossing 19 by a position correction signal directly proportional to the plus ΔS error, but opposite in algebraic sign. Similarly, a minus ΔS in the 17 to 18 region of the curve 16 is driven to zero by a position correction signal proportional to the minus ΔS error but opposite in algebraic sign.

The position servo includes means to detect that the displacement error ΔS is within the 17–18 region of curve 16. For example, ΔS is sensed and a correction signal of opposite sign is applied to the drop positioning mechanism (e.g. a charging electrode in an ink recorder). If the next ΔS is greater than the previous ΔS, a correction of the same algebraic sign is repeatedly applied until ΔS begins to diminish instead of grow. If the reduction in ΔS continues upon repeated checks of ΔS and application of a negative feed back correction signal, than the ΔS is within the 17–18 region of curve 16. The region to the left of side peak 23 contains ΔS values that cause a position servo to drive ΔS to the value at zero crossing 21. This result is avoided by several techniques including comparing ΔS after a correction is made to a reference that corresponds to the slope of curve 16 in the 17–18 region. Another technique is to use only curve 16 amplitudes that are greater than the peak value 24 or less than the peak value 23. Still another solution is to compensate for the steady state offset 25 by electrical biasing techniques. This effectively makes curve 16 symmetrical about the horizontal axis and only one zero crossing is involved.

The z axis sensor of the present invention is normally used to indicate the time a drop crosses the zero crossing 19. Since the z axis is the flight direction of a drop, all the points on a curve 16 are generated as the drop flies past two output fibers. This is true for various flight paths displaced along either or both the x and y axis provided the drop is within the sensing zone. Electrical circuitry responsive to the light collected by fibers 5 and 6 merely look for a zero crossing 19 subsequent to the occurrence of first positive peak 17. The zero crossing 19 occurs at the moment the drop crosses the bisector 8. The horizontal axis of FIG. 7 indicates plus and minus units of time relative to the zero crossing 19.

Turning now to FIG. 1, an ink jet recording system employing a plurality of the present position sensors will be described. A fluid ink contained in reservoir 30 is moved by pump 31 into the manifold 32 of an ink drop generator. The manifold includes a plurality of nozzles 33 (See FIG. 2) which emit a continuous filament of fluid 34. Drops 7 are formed from the filament at a finite distance from the nozzle due to regular pressure variations imparted to the ink in the manifold by a piezoelectric device 35. The piezoelectric device is driven at a frequency in the range of from 100 to 125 kilohertz which gives rise to a stream of drops 7 that are generated at a frequency near that of the piezoelectric device. The pressure of the ink in the manifold is controlled by the pump 31 and establishes the velocity of the drops 7. The pressure variations introduced by the piezoelectric crystal 35 are small but are adequate to establish the rate of drop generation. Both the velocity and drop frequency are under the command of a microcomputer or controller 36. Drop velocity is controlled by regulating the pump to appropriately increase or decrease the ink pressure in the manifold 32. The controller communicates with the pump 31 via amplifier 37 and digital to analog (D/A) converter 38. The controller communicates with the piezoelectric device 35 by means of the amplifier 39 and D/A converter 40.

A charging electrode 42 for each nozzle is located at the position where a drop 7 is formed from filament 34. The charge electrodes are also under the control of the microprocessor 36. The electrodes 42 are coupled to the controller 36 by means of an amplifier 43 and a D/A converter 44. The function of the charging electrodes is to impart a net positive or negative charge to a drop 7. The fluid is conductive and is electrically coupled to ground through the manifold 32. When a voltage is applied to an electrode 42 by the microprocessor at the instant of drop formation, the drop assumes a charge corresponding to the voltage applied to the electrode. In the embodiment illustrated in FIGS. 1 and 2, uncharged drops follow an undeflected flight path 45 toward the target 46. Charged drops are deflected left and right of path 45 in the x-z plane depending upon the sign of the charge. The x-z plane is determinable from the x, y and z coordinate vectors shown in FIG. 1. Predetermined values of positive and negative charge for a drop 7 will cause it to follow a path that directs it into a gutter 49 located to the right and left of the centerline path 45.

The system of FIG. 1 is a multiple nozzle recorder. The system employs a separate sensor of the type described in connection with FIGS. 3 and 7 for each nozzle. The multiple sensors are mounted on the sensor support board 52. Support board 52 has an aperture 53 (See FIG. 4) that permits the drops 7 emitted by the nozzles to be either collected by a gutter 49 or pass through to the target 46. A charged drop is deflected due to a static electric field between left and right deflection plates 47 and 48 associated with each nozzle. The deflection plates 47 and 48 have very high voltages coupled to them as indicated by the + and −V symbols shown in FIG. 2 to create the deflection fields. The potential difference between the + and − V voltages is generally in the magnitude of 2000–3000 volts. The magnitude of the voltage applied to the charging electrode 42 is generally in the range from 10–200 volts.

Referring to FIG. 2, the gutters 49 are shown located at half the distance between two nozzles. Accordingly, adjacent nozzles are able to have drops deflected to the same gutter. Likewise, a sensor is located on the support board 52 at each of the gutter locations so that a sensor is shared by adjacent nozzles.

The objective of the recording system is to have each of the plurality of nozzles responsible for placing drops at some finite number of pixel positions on the target at the print line 54. The dots 55 represent the ideal pixels in a row of a given raster pattern. The nozzle second from the right in FIG. 2 is responsible for placing a drop at the n through n+5 pixels on the print line 54 as an example. The adjacent nozzle to the left is responsible for placing drops at the pixel positions n−1 through n−6. Similarly, the adjacent nozzle to the right is responsible for placing drops at the n+6 through n+11 pixel positions and so on. Because the velocity, charge, and mass of the drops generated in each stream is different to some degree, the same voltage applied to each of the charging electrodes 42 does not result in drops from adjacent nozzles being exactly aligned, e.g. to the n and n−1 pixel positions. When the drops from adjacent nozzles are in fact aligned to adjacent pixel positions such as the n and n−1 positions, the drops from the nozzles are said to be "stitched" together.

The stitching is achieved by calibrating each nozzle with a common standard. The standard is the physical spacing between the multiple sensors on the sensor board 52. The drops emitted from a given nozzle are first charged by a voltage applied to the charging electrode called the LEFT voltage. The LEFT voltage is some value that causes drops to be directed into a gutter 49 to the left of the given nozzle. A sensor like that described in connection with FIGS. 3 and 7 is positioned at the gutter. The sensor is part of a servo loop which adjusts the voltage applied to a charging electrode 42 until the drops pass exactly under the bisector 8 of the sensor. Next, a RIGHT voltage is applied to the charging electrode 42 causing drops to be deflected near the gutter 49 to the right of the nozzle under test. The sensor located at the right hand gutter is also part of a servo loop which adjusts the RIGHT voltage until the drops pass directly under the bisector 8 of this sensor. The calibrated LEFT and RIGHT voltages for the given nozzle are stored by the microprocessor 36. LEFT and RIGHT voltages are calibrated in this fashion for each of the nozzles. Consequently, since the sensors are precisely located on board 52 relative to each other, the calibrated LEFT and RIGHT voltages for the plurality of nozzles enable the recorder to print a row of drops on target 46 that are accurately aligned, i.e. stitched, to the ideal pixel points 55 along a print line 54.

The position servo loop for the alignment of a drop to the bisector 8 is the same for each of the multiple sensors on board 52. In fact, the light source, the photodiodes and related circuitry are shared. Referring to FIG. 1, the position servo loop includes the microprocessor 36, the light emitting diode (LED) 58 and photodiodes 61 and 62. The sensor board 52 can be positioned at many locations along the z axis. The location in FIGS. 1 and 2 is convenient because separate gutters for collecting test drops are not needed. For example, the sensor board and separate gutter means can be located behind the target 46. In this case, the calibration operations are performed during interdocument gaps, i.e. the space between subsequent targets 46 moved past the print line 54.

The LED 58 is electrically coupled to the controller 36 via the amplifier 60 and pulse generator 59. The LED is optically coupled to the remote end of an input optical fiber of a sensor corresponding to fiber 2 in FIG. 3. The photodiode 61 is optically coupled to the remote end of an output optical fiber corresponding to fiber 5 in FIG. 3. The photodiode 62 is optically coupled to the remote end of an output optical fiber corresponding to fiber 6 in FIG. 3. The photodiodes are in turn coupled to the plus and minus terminals of a differential amplifier 64. The output of amplifier 64 is an electrical signal corresponding to curve 16 in FIG. 7. The symbols $X_L$ and $X_R$ represent left and right output fibers from a sensor corresponding to the fibers 5 and 6 in FIG. 3. The symbol $\Delta X$ represents the amplitude of the output of amplifier 64 and is the error signal for the position servo loop. The $\Delta X$ output of amplifier 64 is coupled to the controller 36 through analog to digital (A/D) converter 65.

The position servo, as is well understood in the electrical and electrical-mechanical art, operates to reduce any $\Delta X$ error signal to zero. A particular $\Delta X$ corresponds to a particular LEFT or RIGHT voltage for a given nozzle. (Only the case for the LEFT voltage needs be described since the same description applies to the calibration of the RIGHT voltage with allowance for different algebraic signs.) The controller 36 makes a correction to the LEFT voltage proportional to the $\Delta X$ signal from amplifier 64. The corrections are repeated until $\Delta X$ is equal to zero. At that time, the LEFT voltage charges the drops from a nozzle to a level that causes them to be deflected by the field between plates 47 and 48 exactly aligned to the bisector 8 for the sensor under test. This calibrated LEFT voltage is stored by the microprocessor and a calibrated RIGHT voltage is likewise measured and stored. The calibrated voltages enable the nozzle under test to accurately place its drops to its assigned pixel position in the row of a raster. The reason is that the deflection process for a given nozzle is highly linear within reasonable deflection angles of up to about 15°. Knowing the precise location of two drop locations within a nozzle's reach means that all the other locations within its reach can be calculated by appropriate scaling.

As explained in connection with FIG. 3 the fibers 5 and 6 can also be oriented along the z axis thereby defining a z axis sensor. The photodiodes 67 and 68 are coupled to the remote ends of z axis output fibers. The free ends of the z axis output fibers are aligned to receive light from the same input fiber serving the x-axis output fibers. The photodiodes 67 and 68 are in turn coupled through the differential amplifier 69 and D/A converter 70 to the microprocessor 36. The output time, $T_o$, from differential amplifier 69 that is of importance is the time of occurrence of the zero crossing corresponding to point 19 in FIG. 7. The controller 36 measures the length of time between the application of a charging voltage to an electrode 42 and the occurrence of the zero crossing $T_o$. This time is very long compared to the time required by a drop to traverse the distance between apertures 16 and 17 in FIG. 1 of the Kuhn et al patent supra. As such, the velocity measure obtained with the z-axis sensor is very accurate. The controller 36 adjusts the pressure in the ink manifold in response to the z-axis sensor input to adjust the velocity. The adjustment is possible by virtue of the controllers connection to pump 31.

The phase of the voltages applied to the charging electrodes is adjustable using the x axis sensor and the output of the differential amplifier 64. The phase in question is the relation between the lead edge of the charging voltage and the moment of drop formation. The duration of the charging pulse in a system where the drop formation rate is 100 kilohertz is equal to or less than 10 microseconds. In practice, the charging pulse will have some duration shorter than the 10 microsecond permissible time period for the 100 kH drop generation rate. Ideally, the lead edge of the charging voltage should preceed the moment of drop formation to insure that the voltage is at its full level at the instant of drop separation. The phasing is adjusted by directing a stream from a given nozzle over the left gutter sensor, for example, with a calibrated LEFT voltage. Then the voltage is switched on and off at different start times to detect a good phase. The reader is referred to the Carmichael et al patent supra for greater detail. The foregoing tests or calibrations are valid for as long as several minutes and can be made in between generation of separate records.

After all the nozzles have been adjusted for stitching alignment, correct phase and the drop velocity is correct, the printing operation is ready to begin. The record member or target 46 is moved in the +y direction in the x-y plane according to the x, y, z coordinates shown in FIG. 1. A drive wheel 73 is shown in an operative position to transport the target or record member in the +y direction. The drive wheel is mechanically powered by electric motor 74. The motor is under the control of the microprocessor 36 by virtue of the amplifier 75 and D/A converter 76. Video information is fed into the controller 36 as indicated by the arrow 77. The video information is stored in allocated memory sections of the microprocessor so that the printing or recording process can be carried out at a speed compatible with the generation of the ink drops and the motion of the paper or record member 46.

The printing or recording process begins by the controller 36 issuing a command to motor 74 to start moving the record member 46 past the printing line 54. The plurality of nozzles are simultaneously fed video information from the controller that causes the drops to be charged to a value to place them at the various n through n+5 pixel positions covered by a nozzle. The movement of the record medium in the x, y plane propagates the row of drops over the record medium to achieve the creation of the entire raster.

Turning now to the multiple sensor array, FIG. 4 shows an enlargement of sensor support board 52. The view is taken along view lines 4—4 in FIG. 2. The x, y, z coordinate axis is illustrated for convenience. The positive z axis is the direction of the flight of the ink drops. The support board 52 includes an aperture 53 in the x plane to allow the droplets to pass through the board towards the target 46. The points 7 indicate the drop streams issued from the plurality of nozzles for the printer system of FIG. 2.

Sensor board 52 includes a multiplicity of x and z axis sensors each comprising an input fiber 2 and two output fibers 5 and 6 and third and fourth output fibers 80 and 81. The x axis sensor includes the input fiber 2 and the output fibers 5 and 6 corresponds to the system described in connection with FIGS. 3 and 7. The z axis sensor includes the same input fiber 2 and third and fourth output fibers 80 and 81 (See FIG. 5). Fibers 80 and 81 correspond to fibers 5 and 6 in FIG. 3 but rotated 90° about the bisector 8. The x axis sensor generates the $\Delta X$ error information for the position servo loop explained in connection with FIGS. 1 and 2. The z axis sensor generates the $T_o$ signal used to regulate the velocity of the drops.

The x and z axis sensors associated with each nozzle are the same. A description of one x or y or z axis sensor is adequate to describe them all. The sensors are attached to board 52 with the distance between them being controlled to a tolerance of about ±0.003 mm. This tolerance insures good drop stitching.

An advantageous feature of the present invention is the fact that the multiple sensors share common electronics. This is achieved by terminating all the common output fibers into the same photodiode and by terminating all of the input fibers into the same LED.

As explained earlier, the microprocessor 36 drives or strobes the LED 58 by issuing commands to turn on the pulse generator 59. When on, the pulse generator applies a pulse of appropriate magnitude to the LED through the amplifier 60. The pulses are generated at roughly at 100 to 125 kH rate appropriate for the particular drop generation rate. Each time the LED is energized by the controller, light is pumped simultaneously into every input fiber 2 for each of the nozzles in a recorder. On the output side, each of the similar fibers from the multiple sensor are tied to the same photodiode. All of the left output fibers (corresponding to fiber 5 in FIG. 3) have their remote ends terminated at photodiode 61. All of the right output photodiodes (corresponding to fiber 6 in FIG. 3) have their remote ends terminated at photodiode 62. All of the upstream output fibers 80 have their remote ends terminate at the photodiode 67. Finally, all of the downstream photodiodes 81 have their remote ends terminated at photodiode 68.

When the LED is turned on and there are no drops being directed by the nozzles past the sensors, the x axis output fibers 5 and 6 at each nozzle receive balanced amounts of light from the LED. Similarly, the z axis output fibers 80 and 81 receive balanced amounts of light from the LED. When a drop from one nozzle is sent past only one sensor at some ΔS from the bisector 8, the inbalance in light due to the drop gives rise to a ΔX error signal at output of the differential amplifier 64 even through the photodiodes see balanced amounts of light from all the other sensors. Should the sensitivity of the shared electronics become unacceptable, the number of photodiodes and differential amplifiers is increased to reduce the number of fibers coupled to a single photodiode.

The controller 36 calibrates the plurality of nozzles one at a time. For example, the far left nozzle in the array is calibrated first then the second and so on until the far right nozzle is calibrated. At each nozzle, the LEFT voltage is applied to the charging electrode and if a non-zero ΔX is generated from the left gutter sensor, the LEFT voltage is adjusted until ΔX is equal to zero. Next a RIGHT voltage is coupled to the charging electrode and if a non-zero ΔX is generated from the right gutter sensor, the RIGHT voltage is adjusted until ΔX is equal to zero. The $T_o$ velocity calibration can be made at either or both the left or right gutter sensor. Since there is only one manifold in the recorder of FIG. 1, the velocity test made at the far left gutter z axis sensor is good for all the nozzles. Consequently, a z axis sensor is included only at the far left gutter location.

The differential amplifiers 64 and 69 are the same. The details of only one are described since the description is applicable to the other. Referring to amplifier 64, the outputs of the photodiodes 61 and 62 are coupled to the inverting inputs of operational amplifiers 83 and 84. The non-inverting inputs to those amplifiers are coupled to ground potential as indicated by the symbol 85. 500,000 ohm resistors 86 and 87 are coupled between the outputs and the inverting inputs of the amplifiers. In the configuration shown, amplifiers 83 and 84 are current to voltage converters. The outputs of the operational amplifiers 83 and 84 are fed respectively to the + and − terminals of the differential amplifier 88. The output of amplifier 88 is the error signal ΔX. Amplifiers 83, 84 and 88 are the Model TL084 Operational Amplifier available from Texas Instruments. The TL084 has a high input impedence and slew rate of about 4 volts per microsecond which is more than adequate for the 100–125 kH drop generation rate.

Turning now to FIGS. 5 and 6, the construction of the fibers on the support plate 52 will be explained. FIG. 5 is a sectional view taken along lines 5—5 in FIG. 4. FIG. 4 shows the support plate 52 and the location of the output fibers 5, 6, 80 and 81.

The fibers have a diameter D=0.075 like those described in connection with FIGS. 1, 2, 3, 4, 5 and 6. All the fibers described herein are of the type available from Augat Inc., Attleboro, Mass. 02703 in the Two Meter Cable Assembly, Part No. 698010G 200. The infrared emitting LED and infrared sensitive photodiodes described in this application are the type available from Augat Inc., as Emitter Part No. 698013EG1 and Detector Part No. 698014DG1.

The left and right groups of fibers in FIG. 4 are located adjacent left and right gutters 49 and are equidistant from the center line of the nozzle. The distance A is equal to the nozzle to nozzle spacing for all the nozzles in the printer of FIGS. 1 and 2 and this dimension is rigidly controlled. This is necessary as explained earlier for the stitching or alignment process. The point of alignment at each sensor is the bisector 8 between the right and left output fibers 5 and 6. Under the control of the microprocessor 36, drops are first positioned under the left bisector and then under the right bisector. A unique LEFT and RIGHT voltage is generated for each nozzle, wherein the LEFT and RIGHT voltages cause the drops from that nozzle to pass directly under the left and right bisectors. Since all of the sensors on the plate 52 are rigidly aligned to each other, it follows then that once the electrical alignment to the bisectors 8 is achieved, that all the drops produced by the multiplicity of nozzles are accurately aligned to the ideal pixel positions in a row of a raster pattern. The sensors are not located at the print line 54. Consequently, the LEFT and RIGHT calibrated voltages are scaled appropriately to allow for the offset of the sensor from line 54.

The xyz coordinate vectors are shown in FIG. 5 to help orient the reader. As a reminder, the positive z axis is the direction of the drop streams.

The support board 52 is preferably made of a material that is easily machined, such as aluminum. It includes a thickness B adequate to give good mechanical stability. A suitable thickness for an aluminum board is 2.5 mm. Triangular grooves 90 are cut into the surface of the support board 52 to accomodate and mechanically align the fibers 5, 6, 80 and 81. The depth of the triangular groove C is about 0.225 mm and the base E is about 0.450 mm. The angle at the apex of the triangular groove is 90°. All of the fibers 5, 6, 80 and 81 have circular cross sections that are equal in diameter, e.g. 0.075 mm. The four fibers fit into the groove symetrically as illustrated. Fiber 80 aligns fibers 5 and 6 in the groove. Fibers 5 and 6 in turn provide means for aligning fiber 81. The fibers are permanently bonded to the board by the application of an appropriate glue over the bundle of four fibers. The bisector 8 located in the center of the four equal fibers is a distance F below the grooved surface of the support board 52.

The depth of the groove C need only be adequate to permit the fibers 5, 6 and 80 to be seated into the groove. The fourth fiber 81 in turn is seated on top of the fibers 5 and 6. It is also apparent that the apex of the triangular groove is aligned with the bisector 8. Consequently, the use of triangular grooves and cylindrical fibers is an extremely accurate technique for establishing the sensor-to-sensor spacing A.

The four fibers 5, 6, 80 and 81 need not be the same dimension. However, it is preferred to keep the logical pairs 5 and 6 and 80 and 81 the same dimension. Also, the apex angle of groove 90 can be varied to achieve various stacking alignments for the fibers.

It was explained in connection with FIG. 4 that the fiber pair 80 and 81 is used only at the far left gutter sensor location. Nonetheless, the fibers 80 and 81 are still included at every slot in order to align the fibers 5 and 6 to the same elevation F. The remote ends of these dummy fibers are simply not coupled to either photodiode 67 or 68.

The triangular cross section of the grooves need not be maintained at any significant distance away from the aperture 53. The reason is that the circular faces of the fibers are what need be aligned for the sensor. In fact, the groove 90 can be enlarged at the appropriate areas on board 52 to accomodate the fiber bundle created by routing the ends of all the 6 fibers to the photodiode 61 and all the ends of the 5 fibers to photodiode 62. As indicated in FIG. 4, the fibers are required to cross over adjacent fibers in order to follow the pattern illustrated in FIG. 4. As is well understood, there is no optical crosstalk between the fibers even though they are overlapping. In fact, the flexibility of the fibers is an advantageous feature of the present invention.

Referring now to FIG. 6, the input fibers 2 are also aligned in triangular grooves 91. Once again, the apex to apex spacing of these triangular grooves 91 is the same dimension A as for the apex to apex spacing of the grooves 90 for holding the output fibers. The dimension A is also equal to the nozzle spacing. A presently preferred nozzle spacing A is 2.16 mm. The angle at the apex of the triangular groove 91 is illustrated as 90° but it could be another angle. Once again, in the embodiment disclosed, the diameter D of the input fiber is the same as that for the output fibers which is about 0.075 mm.

The important dimension is the depth F of the axis of the fiber 2 below the surface in which the groove is formed. The dimension F is the same as the dimension F shown in FIG. 5 for the output fibers. In FIG. 5, F locates the bisector 8 between the four fibers. The depth M and the base N of the input fiber grooves 91 are selected to achieve the alignment of the axis of fiber 2 at the depth F. The apexes of the input and output fiber grooves 90 and 91 are also aligned in the z axis of the coordinate system. Consequently, the light emitted from the face of fiber optic 2 radiates symmetrically towards the four output fibers 5, 6, 80 and 81 because the center line of fiber 2 is aligned by grooves 90 and 91 to the bisector 8.

The triangular grooves 90 and 91 are conveniently formed into the board 52 by a right angle tipped milling tool, or by grinding or shaping. The thickness of board 52, of course, must be adequate to accommodate the groove depth without loss of mechanical stability for the board.

FIGS. 8 and 9 disclose another embodiment of a recording system using the the sensor of the present invention. In FIG. 8, the drum 100 is mounted about its axle or axis 101 for high speed revolution. The drum is adapted to hold a sheet of paper or other record member about its periphery. An ink drop generator 102 is closely spaced from the drum and is coupled by means of a slide 103 to a stationary rail 104 that extends the entire length of the drum and is substantially parallel to the axle 101. Appropriate means (not shown) such as a continuous pulley loop are attached to the slide to translate the ink drop generator parallel to the axis 101 of the drum. The ink drop generator 102 may have one or more nozzles for generating one or more streams of drops. If the ink generator is the type described in the embodiment of FIGS. 1 and 2 it will also include a charging electrode, a gutter and deflection plates. The deflection plates would be oriented parallel to the plural streams so as to either deflect the drop to the gutter or allow it to go to the drum in a binary yes-no fashion. Alternately, the generator could be a kind that expells a drop through a nozzle in an ink chamber when a diaphragm in the chamber is deformed. An ink drop generator of this type is disclosed in the Kyser and Sears U.S. Pat. No. 3,946,398, the disclosure of which is incorporated herein. The Kyser and Sears ink generator does not employ charged drops. Nontheless, the optical sensor of the instant invention is capable of determining the position of drops generated by it in an x, y, z coordinate system.

The recorder of FIGS. 8 and 9 creates pictorial images by addressing the rows and columns of pixel positions in a raster by simultaneously translating the ink generator 102 along its rail and by rotating the drum at a high speed. It is easily envisioned that during the translation of the ink generator and the rotation of the drum, a helix is inscribed on the surface of the drum by the drops from generator 102. If multiple ink nozzles are included in the ink generator then multiple hilexes will be simultaneously inscribed on the drum. Recording systems of this type are disclosed by Van Hook et al in U.S. Pat. No. 4,009,332, the disclosure of which is incorporated herein.

At a convenient location on the surface of the drum, such as near an edge as shown in FIG. 8, an aperture 106 is cut into the surface of the drum to permit the passage of drops. Aperture 106 generally defines the sensing zone for the x and y axis sensors built according to the present invention. The x axis sensor includes the input optical fiber 107 and the left and right output optical fibers 108 and 109. The y axis sensor includes the y input optical fiber 111, the output optical fiber 112 and the output optical fiber 113.

The xyz right hand rule vectors are illustrated in FIGS. 8 and 9 for convenience and for orientation of the reader. Once again, the positive z axis is the direction of the ink drop flight.

Once again, the fibers are all 0.075 mm fibers and are aligned relative to each other using the technique described in FIGS. 5 and 6. Fibers corresponding to fibers 80 and 81 (not shown in FIG. 8) are aligned along the z axis and are available for drop velocity measurement if desired.

To repeat, the x axis sensor group including the input fiber 107 and the two output fibers 108 and 109 are arranged as explained in connection with the description in FIGS. 3 and 7. Similarly, the y axis fibers 111, 112 and 113 are also arranged as explained in connection with the description of FIGS. 3 and 7. The difference between the x and y axis sensors is merely that they are oriented 90° relative to each other. The remote ends of all six of the fibers terminate at the edge 115 of the drum. The fibers are rigidly coupled to the surface of the drum 100 and rotate with it. Note that there are no electrical components associated with the sensors that are located on the drum. Rather, the electronics are located on a stationary support 122 adjacent to the drum along with fiber optics that mate with the ends of the six fibers 106, 107, 108, 111, 112 and 113.

The remote ends 116–121 of the optical fibers in the x and y axis sensors terminate with their faces spaced across a small air gap and in alignment with the faces of the remote ends of mating optical fiber 107*a*, 108*a* and 109*a* for the x axis sensor and 111*a*, 112*a* and 113*a* for the y axis sensor. The mating optical fibers are fixedly mounted on support 122 which is a partial cylinder whose diameter is the same as drum 100 and whose axis is concentric with drum axle 101. Consequently, once during every revolution of drum 100, the remote ends of the fibers 107, 108, 109, 111, 112 and 113 are optically coupled to the mating fibers 107*a*, 108*a*, 109*a*, 111*a*, 112*a*, and 113*a*. The remote ends of the sensor fibers and the entire length of the mating fibers are more conveniently packaged in a bundle or cable and terminate at fiber optic connectors. Commercially available fiber optic bundles and connectors are also convenient packages for the fibers discussed in connection with FIGS. 1 and 2, e.g. the Augat, Inc. parts described supra.

The mating fibers complete the optical circuits described in FIGS. 1 and 4. The x axis output fibers 107*a* and 108*a* terminate at photodiodes 131 and 132, respectively. The x and y axis input fibers 109*a* and 113*a* are both coupled to LED 133. The y output fibers 112*a* and 113*a* are coupled to photodiodes 134 and 135, respectively.

The LED 133 is strobed or turned on at the time the x and y axis sensors fibers on drum 100 are in the vicinity of the stationary mating fibers 107*a*, 108*a*, 109*a*, 111*a*, 112*a* and 113*a*. X and y axis position servo loops like those described in connection with the printer of FIGS. 1 and 2 are used here (but not shown). The x and y photodiodes 131, 132, 134 and 135 are coupled to appropriate differential amplifiers to generate ΔX and Δy displacement error signals for a microprocessor such as controller 36. Differential amplifier 136 corresponding to that described in FIG. 4 is shown for the x sensor in FIG. 8. A like amplifier is coupled to the y photodiodes 134 and 135 to develop a Δy signal for a microprocessor. If a z axis sensor is used, a third amplifier 136 is coupled to its fibers through photodiodes just as in the case of the x and y axis sensors.

Differential amplifier 136 includes the two operational amplifiers 138 and 139. The non-inverting terminals of these operational amplifiers are coupled to the ground potential as represented by the symbols 140. The inverting terminals are coupled to the photodiodes. A 500,000 ohm resistor is placed between the output and the inverting input. The amplifiers are current to voltage converters when wired in this fashion. The output of the two amplifiers 138 and 139 are in turn coupled to the plus and minus terminals of the differential amplifier 142. The output of amplifier 142 is the ΔX position error signal.

FIG. 9 is a sectional view of drum 100 taken along lines 9—9 in FIG. 8. The drum is shown at an angular position having the aperture 106 positioned between a stationary tray 145 for collecting ink drops and the ink generator 102. The dash line 146 indicates the trajectory of ink drops emitted by the ink generator 102 and directed through the aperture 106 into collection tray 145. The stationary support member 147 is coupled to the drum bearing 148 in which the axle 101 is mounted for rotation.

The sensors of FIGS. 8 and 9 are used in a recording system to calibrate the position servos for the ink generator 102 and the drum rotation. The sensor aperture 106 is preferably located near the edge 115 of drum 100 in a region not covered by the recording paper. At some periodic interval which may include several minutes, the generator 102 is positioned along rail 104 adjacent the location of aperture 106. As the aperture passes underneath the ink generator during the rotation of the drum, the generator emits a drop (or a stream) that flys through the aperture into tray 145. The x and y axis sensor fibers measure the alignment of the drop relative to a bisector 8 between the x output fibers 108 and 109 and the y output fibers 112 and 113. This measurement occurs simultaneously. Any position errors in the x axis are corrected by incrementing the ink generator 102 along the rail a proportional amount. Position errors in the y axis are corrected by advancing or delaying the instant at which the drop is directed from the ink generator into the tray. A velocity measurement is also made when a z axis sensor is present.

Other objects and features of the invention will be apparent to those skilled in the art from a reading of the specification and from the drawings. Such modifications are intended to be included within the scope of the present invention.

What is claimed is:

1. A fluid drop recorder comprising a record member support and a fluid drop generating means positioned for relative movement in the x, y plane of an x, y and z orthogonal coordinate system, and fluid drop sensor means for sensing the location of drops emitted along the z axis by the fluid drop generating means including at least one axis sensor including an input optical means and two output optical fibers having free ends facing each other for sensing a drop along either the x or y axis with light emitted by the input fiber and entering the output fibers.

2. The recorder of claim 1 wherein the input optical means includes an optical fiber.

3. The recorder of claim 1 wherein the sensor means further includes photodetector means coupled to remote ends of the output fibers and differential circuit means electrically coupled to the photodetector means for indicating the location of a drop relative to a bisector between the two output fibers.

4. A fluid drop recording method comprising supporting a fluid drop generator for movement relative to a record member in the x, y plane of an x, y, z orthogonal coordinate system with the generator emitting fluid drops toward the record member along the z axis, positioning at least one fiber optic sensor relative to the z axis for detecting the location of a drop at least along the x axis including facing a free end of an input optical fiber toward the free ends of first and second output optical fibers and locating the input and output fibers on opposite sides of a drop flight path, detecting the relative amount of light received by the first and second output fibers from the input fiber and using the detected relative amount of light in the fibers as a measure of the location of a drop passing through the light emitted by the input fiber and received by the output fibers.

5. An ink drop recording method comprising aligning a plurality of ink jet nozzles relative to an an x axis so that each emits filaments of a conductive fluid along a z axis of an x, y, z coordinate system exciting the fluid emitted from the nozzles in a manner to promote the formation of drops from the plurality of nozzles at a finite distance from the nozzles, charging selected drops with a charging electrode associated with each filament, deflecting charged drops along the x axis with a steady state electric field in the path of the drops from each nozzle aligning a plurality of optical fiber sensors fixedly relative to each other along the x axis for aligning drops from adjacent nozzles to an ideal row of pixels at a recording plane including aligning individual sensors adjacent each stream with each sensor means including a free end of an input optical fiber facing the free ends of first and second output fibers defining an x axis sensing zone between the fiber faces wherein light emitted from the free end of the input fiber is collected by the free ends of the two output fibers.

6. Ink drop recording apparatus comprising a plurality of nozzles for emitting filaments of a conductive fluid along a z axis of an x, y, z coordinate system and means for promoting the formation of drops from the filaments at a finite distance from the nozzles, charging electrodes for each nozzle located at the region of drop formation for charging drops, deflection means for each nozzle for deflecting charged drops along the x axis and a plurality of optical fiber sensor means for said nozzles fixedly aligned relative to each other along the x axis for aligning drops from adjacent nozzles to an ideal row of pixels at a recording plane each sensor means including input optical means having a free end facing the free ends of first and second output optical fibers with the space between the free ends defining a sensing zone positioned in the flight path of a drop, the ends of the output fibers being arranged relative to the input means to enable both fibers to collect light emitted from the input means.

7. The apparatus of claim 6 wherein at least some of said plurality of sensor means are located to sense drops prior to their arrival at a target.

8. The apparatus of claim 7 further including a plurality of gutter means associated with the nozzles for collecting drops not intended for a target and wherein at least some of said sensor means are located at said gutter means.

9. The apparatus of claim 8 wherein said plurality of gutter means are spaced apart at substantially the same spacing as the spacing between said plurality of nozzles.

10. The apparatus of claim 9 wherein one gutter means is located substantially equal distance to the left and right of each nozzle whereby adjacent nozzles share a common gutter means.

11. The apparatus of claim 10 wherein said deflection means and charging electrode means are coupled to voltage sources that cause uncharged drops to pass undeflected to the target and drops charged to one polarity are deflected to the left gutter means and drops charged to the opposite polarity are deflected to the right gutter means.

12. The apparatus of claim 6 wherein the first and second output fibers are positioned relative to the flight of a drop through the sensing zone for detecting the position of a drop along the z axis.

13. The apparatus of claim 6 wherein the first and second output fibers are positioned relative to the flight of a drop through the sensing zone for detecting the position of a drop along the x axis.

14. The apparatus of claim 6 wherein the free ends of the first and second output fibers and the input fiber define a sensing zone for sensing the location of a drop along the x axis and further including third and fourth output fibers having free ends facing the free end of said input fiber for defining a sensing zone for sensing the location of a drop along the z axis.

15. The apparatus of claim 14 further including sensing circuit means coupled to the remote ends of the output fibers for generating an error signal coupled to controller means that operates a fluid pump supplying fluid under pressure to a nozzle emitting the drop to change the fluid pressure until subsequently emitted drops arrive at a predetermined location along the z axis within a predetermined time relative to the formation of the drop at the charging electrode.

16. The apparatus of claim 6 further including sensing circuit means coupled to remote ends of the output fibers for generating an error signal coupled to controller means that changes a voltage applied to the charging electrode for the nozzle that emitted the sensed drop until subsequently emitted drops are at a predetermined location along the x axis.

17. The apparatus of claim 6 wherein the input optical means includes an optical fiber.

18. The apparatus of claim 17 wherein the input fibers of a plurality of the sensor means are coupled to common light source means and a plurality of the first output fibers are coupled to common first detector means and a plurality of the second output fibers are coupled to common second detector means.

19. The apparatus of claim 6 wherein said plurality of sensor means are spaced apart at substantially the same spacing as the spacing between the plurality of nozzles.

20. A fluid drop recorder comprising a record member support and a fluid drop generating means positioned for relative movement along x and y axes of an x, y, z orthogonal coordinate system, fluid drop sensor means for sensing the location of drops emitted along the z axis by the fluid drop generating means including an x axis sensor including an input optical fiber and two output optical fibers having free ends facing each other sensing a drop along the x axis with light exiting the input fiber and entering the output fibers and a y axis sensor including an input optical fiber and two output optical fibers having free ends facing each other for sensing a drop along the y axis with light exiting the input fiber and entering the output fibers.

21. The recorder of claim 20 wherein the sensor means further includes first and second detection means coupled to the remote ends of the x axis outout fibers and third and fourth detection means coupled to the remote ends of the y axis output fibers for generating electrical signals corresponding to the position of the drop along the x and y axes.

22. The recorder of claim 20 wherein the record member support includes a cylindrical drum mounted for rotation and the drop generating means includes a carriage mounted for movement parallel to the axis of rotation of the drum and wherein the free ends of the input and output fibers of the sensor means are fixedly coupled to the drum adjacent its periphery in a location addressable by the drop emitting means.

23. The recorder of claim 22 wherein the remote ends of the input and output fibers of the sensor means terminate at a fixed position on the drum at which mating optical fibers fixedly mounted off the drum align with each drum fiber at least once every revolution of the drum.

24. The recorder of claim 23 wherein the mating optical fibers include source fibers coupled at a remote end to a light source for transmitting light to the remote ends of the x and y axis input fibers and detector fibers coupled at remote ends to detector means for generating electrical signals from light coupled from the x and y output fibers.

25. The recorder of claim 20 wherein the fluid drops are substantially transparent to infrared radiation and further including an infrared radiation light emitting diodes optically coupled to remote ends of the x and y axis input fibers and infrared radiation responsive detector means coupled to the remote ends of the x and y output fibers for generating electrical signals indicating the position of the drops.

26. The recorder of claim 25 further including x axis and y axis sensing circuit means coupled to the x and y axis detector means for comparing the electric signals and for generating x and y error signals when a drop is present between the input and output fibers for indicating the location of a drop in the x axis and y axis.

27. The recorder of claim 26 wherein the sensor means is fixedly coupled to the record support and further including drive means for moving the record member and drop emitting means relative to each other, controller means coupled to the drive means and the x and y sensing circuit means for controlling the x and y axis relative movement of the record member and drop emitting means for reducing x and y error signals substantially to zero.

* * * * *